US009845690B1

(12) United States Patent
Giametta et al.

(10) Patent No.: US 9,845,690 B1
(45) Date of Patent: Dec. 19, 2017

(54) SYSTEM AND METHOD FOR SEALING FLOW PATH COMPONENTS WITH FRONT-LOADED SEAL

(71) Applicant: General Electric Company, Schenectady, NY (US)

(72) Inventors: Andrew Paul Giametta, Greenville, SC (US); James Tyson Balkcum, III, Taylors, SC (US); David Richard Johns, Simpsonville, SC (US); Stephen Paul Wassynger, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 15/172,944

(22) Filed: Jun. 3, 2016

(51) Int. Cl.
*F01D 11/00* (2006.01)
*F01D 9/02* (2006.01)
*F16J 15/02* (2006.01)

(52) U.S. Cl.
CPC ............ *F01D 9/023* (2013.01); *F16J 15/025* (2013.01); *F05D 2240/55* (2013.01)

(58) Field of Classification Search
CPC ............ F01D 11/006; F05D 2300/501; F05D 2250/70; F05D 2240/55; F16J 15/0087; F16J 15/025; F01C 11/006
See application file for complete search history.

(56) References Cited

U.S. PATENT DOCUMENTS

| 6,561,764 | B1 | 5/2003 | Tiemann |
| 7,484,936 | B2 | 2/2009 | Bouchard et al. |
| 8,011,892 | B2 | 9/2011 | Ramlogan et al. |
| 8,545,181 | B2 | 10/2013 | Charlton |
| 8,613,599 | B2 | 12/2013 | Lake et al. |
| 2012/0121423 | A1* | 5/2012 | Honkomp ............. F01D 11/006 416/190 |
| 2012/0237348 | A1* | 9/2012 | Thomen .................... F01D 5/22 416/196 R |
| 2012/0237352 | A1* | 9/2012 | Boyer ....................... F01D 5/22 416/221 |
| 2015/0037167 | A1 | 2/2015 | Simon-Delgado et al. |
| 2015/0064012 | A1 | 3/2015 | Heaven et al. |
| 2015/0118055 | A1* | 4/2015 | Noble ................... F01D 5/3007 416/193 A |
| 2015/0226077 | A1 | 8/2015 | Beattie et al. |
| 2016/0258294 | A1* | 9/2016 | Weinert .................. F01D 5/081 |
| 2016/0273360 | A1* | 9/2016 | Gooren ..................... F01D 5/22 |

FOREIGN PATENT DOCUMENTS

WO 20140160641 A1 10/2014

* cited by examiner

*Primary Examiner* — Gilbert Y Lee
(74) *Attorney, Agent, or Firm* — Ernest G. Cusick; Hoffman Warnick LLC (57) ABSTRACT

This disclosure provides systems and methods for sealing flow path components, such as turbomachine airfoils, with a front-leaded seal. A seal channel is defined between a portion of the suction side surface of a first flow path component and a portion of the pressure side of a second flow path component. A seal is retained within the seal channel formed by the pressure side portion and the suction side portion and the seal channel defines a forward opening through which the seal is inserted during installation.

20 Claims, 7 Drawing Sheets

SYSTEM AND METHOD FOR SEALING FLOW PATH COMPONENTS WITH FRONT-LOADED SEAL

BACKGROUND

The disclosure relates generally to turbomachines, and more particularly, to adjacent flow path components, such as assemblies for radially adjacent airfoils in a gas turbine.

Turbomachines, such as gas turbines, include one or more rows of airfoils, including stationary airfoils referred to as stator vanes and rotating airfoils referred to as rotor blades or buckets. A gas turbine may include an axial compressor at the front, one or more combustors around the middle, and a turbine at the rear. Typically, an axial compressor has a series of stages with each stage comprising a row of rotor blades followed by a row of stationary stator vanes. Accordingly, each stage generally comprises a pair of rotor blades and stator vanes. Typically, the rotor blades increase the kinetic energy of a fluid that enters the axial compressor through an inlet and the stator vanes convert the increased kinetic energy of the fluid into static pressure through diffusion. Accordingly, both sets of airfoils play a vital role in increasing the pressure of the fluid.

In the case of rotor blades, the ring of airfoils are connected to an inner shaft at the base of the airfoils to form the ring. In many applications, it is not practical to manufacture an integral ring of rotor blades. Thus, each rotor blade in the ring may be produced independently, often including an integral base section with a shank and a dovetail portion. The rotor blades may then be assembled into the complete ring by inserting the dovetail portions into the complementary slots in a disk (rotor wheel) that will form a portion of the shaft and connect to adjacent (in the axial direction) stages.

When assembling adjacent rotor blades, the resulting assembly may include small gaps between the shanks of adjacent blades that could provide an undesirable fluid leak path. In some assemblies an aft radial seal is installed substantially perpendicular to the axial direction between adjacent shanks to reduce the leak path and a damper pin is installed substantially parallel to the axial direction and designed to further limit leakage. Other seal configurations for limiting leakage between adjacent shanks are also used in producing rotor blade assemblies.

Rotor blade assemblies are used in a variety of applications, including land based gas turbines, jet engines, high speed ship engines, small scale power stations, or the like. Similar rotor blade assemblies may be used in other applications, such as large volume air separation plants, blast furnace air, fluid cracking air, propane dehydrogenation, or other industrial applications.

SUMMARY

A first aspect of this disclosure provides systems and methods for sealing flow path components, such as turbomachine airfoils, with a front-leaded seal. A seal channel is defined between a portion of the suction side surface of a first flow path component and a portion of the pressure side of a second flow path component. A seal is retained within the seal channel formed by the pressure side portion and the suction side portion and the seal channel defines a forward opening through which the seal is inserted during installation.

A second aspect of the disclosure provides a system comprising a first flow path component, a second flow path component, and a seal. The first flow path component has a forward surface, an aft surface, a pressure side surface, and a suction side surface. The pressure side surface of the first flow path component defines a pressure side portion of a seal channel. The second flow path component has a forward surface, an aft surface, a pressure side surface, and a suction side surface. The suction side surface of the second flow path component defines a suction side portion of a seal channel. The seal is retained within the seal channel formed by the pressure side portion and the suction side portion. The seal channel defines a forward opening through which the seal is inserted during installation.

A third aspect of the disclosure provides a method of installing a front-loaded seal. The method includes the step of positioning a first flow path component with a forward surface, an aft surface, a pressure side surface, and a suction side surface. The pressure side surface of the first flow path component defines a pressure side portion of a seal channel. The method includes the step of positioning a second flow path component with a forward surface, an aft surface, a pressure side surface, and a suction side surface. The suction side surface of the second flow path component defines a suction side portion of a seal channel. The method includes the step of inserting a seal into a forward opening between the forward surface of the first flow path component and the forward surface of the second flow path component and defined by the seal channel formed by the pressure side portion and the suction side portion of the seal channel.

A fourth aspect of the disclosure provides a seal, comprising a flexible member conforming to a seal channel defined between adjacent flow path components. The flexible member comprises an axial portion, a radial portion, and a forward end. The axial portion extends substantially from a forward surface of the adjacent flow path components to an aft surface of the adjacent flow path components. The radial portion extends substantially along a height of the adjacent flow path components proximate the aft surface of the adjacent flow path components and continuous with the axial portion. The forward end is continuous with the axial portion and adjacent a forward opening of the seal channel defined by the forward surface of the adjacent flow path components.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

One challenge of assembling components in the flow path of a turbomachine or similar environment is sealing potential leak paths between adjacent flow path components and doing so in a way that makes assembly efficient and reliable. For example, in the assembly of an airfoil stage, a plurality of airfoils are placed adjacent to one another to form a ring. While the airfoil blades are expected to define a desired flow path through the stage, it is preferable for the ring formed by the adjacent shank portions of the airfoils to act as a solid ring without a leak path through or between the adjacent airfoil shanks. Similarly, other components in the flow path of a turbomachine may be assembled with an adjacent component and create an undesirable leak path absent a reliable seal. For example, shrouds, cover plates, spacers, near flow path seals (NFPS), and other components defining the desired flow path and which are assembled in pieces in some turbomachines may present similar seams between adjacent components in need of sealing.

In some airfoil stages, each adjacent airfoil is installed in the rotor using the dovetail attachment at the base of the airfoil, below the shank. The airfoils are assembled into the ring. While some sealing technologies have been developed that require that some or all of the seal is placed between the adjacent first and second components before the second component is in its final position (to allow the technician to access the seat or other feature into which the seal is installed), a front-loaded seal may be inserted between the adjacent first and second components after they are positioned in the ring through rotor attachment. A similar process could be achieved between other flow path components that are installed in segments and leave a seam in need of sealing. Designing the adjacent flow path components to define a front opening channel between them for receiving a flexible seal improves ease and efficiency of seal installation.

Figure 1:
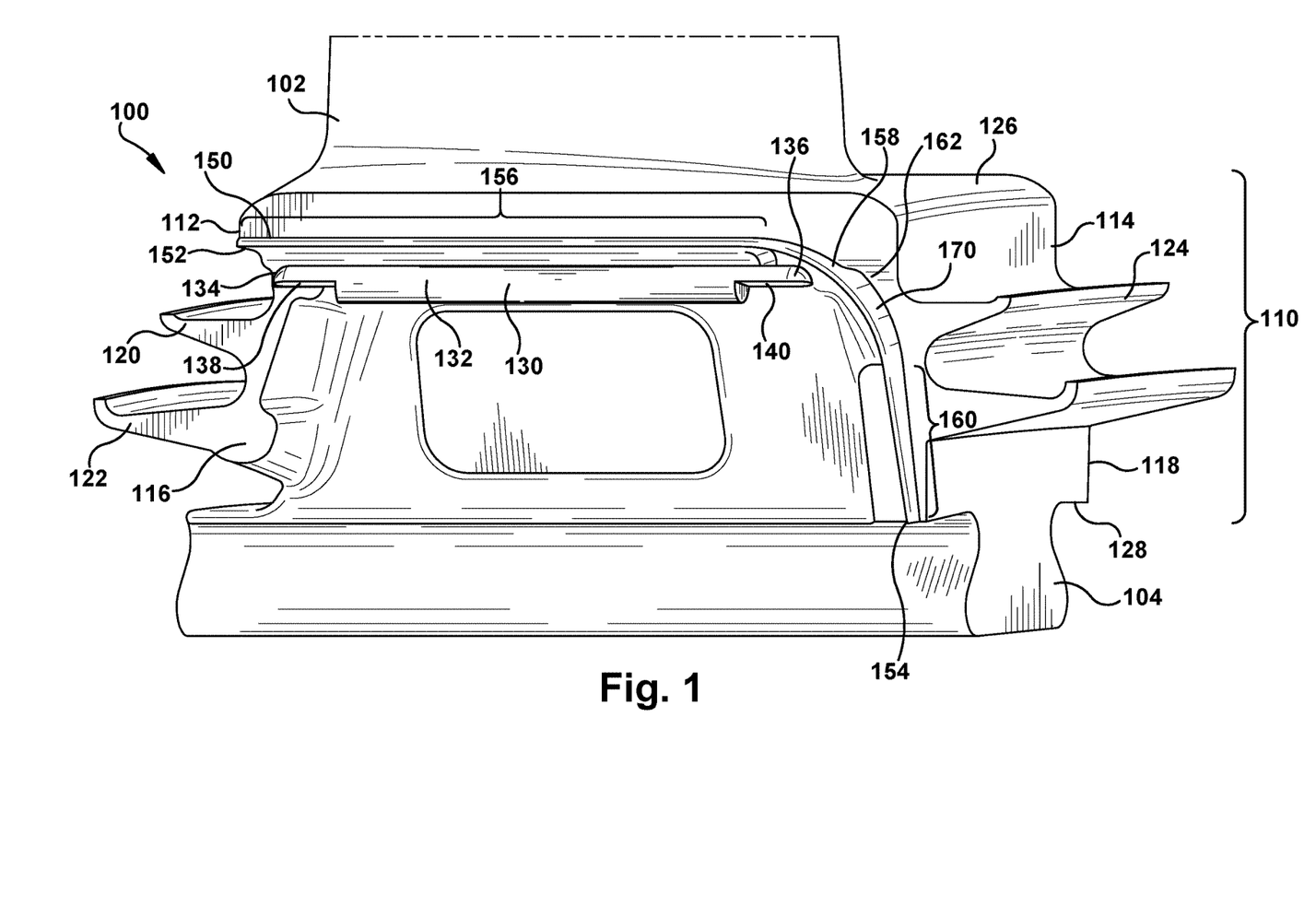
FIG. 1 shows a side perspective view of a portion of an example airfoil with a front-loaded seal.

In FIG. 1, a portion of an airfoil 100 is shown with a front-loaded seal. Airfoil 100 includes an airfoil blade 102 extending vertically (only a portion of which is shown) to define the desired flow path through the turbomachine. Airfoil 100 also includes dovetail 104 on the base of airfoil 100 for attachment to the rotor. Between the airfoil blade 102 and the dovetail 104 is the shank 110 of the airfoil 100. The shank 110 has a shank height measured from where the airfoil blade 102 joins the top of the shank 110 and the dovetail 104 joins the bottom of the shank 110. Note that the airfoil blade 102, the shank 110, and the dovetail 104 are often manufactured as a single piece with a uniform base material (though they may undergo different machining, treatment, and coating processes). The shank 110 has a forward surface 112 (visible only in profile), an aft surface 114, a pressure side surface 116, and a suction side surface (visible only in profile). The forward surface 112 may be defined by the facing of the airfoil 100 that is perpendicular to the general flow path of the turbomachine, earlier in the flow path, and may face the installer when the airfoil stage into which the airfoil 100 is assembled is installed in the turbomachine. The aft surface 114 may be defined by the facing of the airfoil 100 that is perpendicular to the flow path, later in the flow path, and faces away from the installer when the airfoil stage into which the airfoil 100 is assembled is installed in the turbomachine. The pressure side surface 116 may be defined by the facing of the airfoil 100 that is perpendicular to the axis of rotation of the airfoil 100, facing an adjacent airfoil, and on the leading side as the airfoil 100 rotates in operation. The suction side surface 118 may be defined by the facing of the airfoil 100 that is perpendicular to the axis of rotation of the airfoil 100, facing an adjacent airfoil, and on the trailing side as the airfoil 100 rotates in operation. The shank 110 has a width measured in the general direction of the flow path from the forward most feature of the forward surface 112 to the aft most feature of the aft surface 114. Note that this width includes projecting surface features 120, 122, 124 that may not be considered integral to the body width of shank 110. The body width may be defined as the distance from the forward most portion of a theoretically planar forward surface (extending from the forward edge of the upper surface 126 from which the airfoil blade 102 extends to the forward edge of the bottom surface 128 from which the dovetail 104 extends) to the aft most portion of a theoretically planar aft surface (extending from the aft edge of the upper surface 126 from which the airfoil blade 102 extends to the aft edge of the bottom surface 128 from which the dovetail 104 extends) on a line parallel with the axis of rotation of the shaft to which the airfoil 110 is attached.

The shank 110 in FIG. 1 is shown in side view without an adjacent shank that would otherwise obscure the features of the pressure side surface 116. The damper pin 130, the seal channel 150, and the seal 170 are shown as they would appear after installation. Note that in most implementations the adjacent shank would be positioned against the pressure side surface 116 prior to installation of the seal 170.

The damper pin 130 is a component installed between adjacent shanks to provide vibration dampening and reduce wear between adjacent shanks during operation of the turbomachine incorporating the airfoil 110. The damper pin 130 includes a cylindrical body 132 with a forward end 134 and an aft end 136. The forward end 136 includes a recess 138 for accommodating a support feature on the pressure side of the shank 110. The aft end 136 includes a recess 140 for accommodating a support feature (not shown) on the suction side of the adjacent shank.

The seal channel 150 is partially defined by a recess in the pressure side surface 116 of the shank 110. The seal channel 150 is further defined by a complementary recess in the suction side surface of the adjacent shank (not shown) to the pressure side. Similarly, the shank 110 would have a complementary recess (not shown) on the suction side surface 118 to define another seal channel with the adjacent shank to the suction side. The seal channel 150 is further defined by a front opening 152 and a terminal opening 154. The front opening 152 provides the opening through which the seal 170 is inserted into the seal channel 150. The terminal opening 154 defines the end where the inserted end of the seal 170 will terminate once fully installed. In some embodiments, the terminal opening 154 is at least partially defined by the bottom surface 128 of shank 110 and will be sealed by engagement with the surface of the rotor (not shown) to which the airfoil 110 is attached. In some embodiments, the seal channel 150 does not include a terminal opening and terminates at a blind end. The seal channel 150 includes a lateral portion 156 extending from the front opening 152 to a connecting portion 158. The lateral portion 156 is substantially parallel to one or both of the planes defined by the two or more edges of the upper surface 126 and the bottom surface 128 of shank 110. In this context, substantially parallel means the majority of the lateral portion 156 being at an angle less than 15 degrees from at least one of the referenced planes. The seal channel includes a vertical portion 160 extending from the connecting portion 158 to the terminal opening 154. The vertical portion 160 is substantially parallel to the theoretically planar aft surface (extending from the aft edge of the upper surface 126 to the aft edge of the bottom surface 128). In this context, substantially parallel means the majority of the vertical portion 160 being at an angle less than 15 degrees from the referenced plane. The lateral portion 156 and the vertical portion 160 are also substantially perpendicular to one another and their respective reference planes. In this context, substantially perpendicular means the majority of lateral portion 156 is at a 75-105 degree (90 degrees+/−15 degrees) angle from the majority of the vertical portion 160 and/or the aft surface plane. Similarly, substantially perpendicular means the vertical portion 160 is at a 75-105 degree angle from the majority of the lateral portion 156 and/or the upper surface or bottom surface planes.

The connecting portion 158 extends between and connects the lateral portion 156 to the vertical portion 160 such that the seal 170 can be inserted through the forward opening 152, travel through the lateral portion 156, and be guided by the connecting portion 158 into the vertical portion 160 and to the terminal opening 154. In the embodiment shown, the connecting portion 158 is an arcuate channel between the lateral portion 156 and the vertical portion 160. The seal channel 150 in shank 110 defines only a portion of the total seal channel that will guide and locate the seal 170 when it is installed between shank 110 and the adjacent shank. A similar and complementary seal channel on the adjacent shank will complete the seal channel. The seal channel 150 is therefore open to the pressure side surface 116. The seal channel 150 need not be entirely enclosed or a uniform depth along its entire length in the plane of the pressure side surface 116. For example, in the embodiment shown there is an aft opening 162 where a greater portion of the seal 170 may be exposed after installation. As shown in the example embodiment, the seal channel 150 extends substantially along both the body width and the shank height of the shank 110. In this context, extending substantially along means that the seal channel 150 traverses the majority of the body width and the majority of the body height. In one embodiment, the seal channel 150 extends along at least 85% of the body width and at least 85% of the shank height.

The seal 170 is shown in its installed configuration. In one embodiment, the seal is comprised of a flat spring that is inserted through the forward opening 152, travels through the lateral portion 156, and is guided by the connecting portion 158 into the vertical portion 160 and to the terminal opening 154. Additional details of the seal 170 are provided below with regard to FIG. 2.

Figure 2:
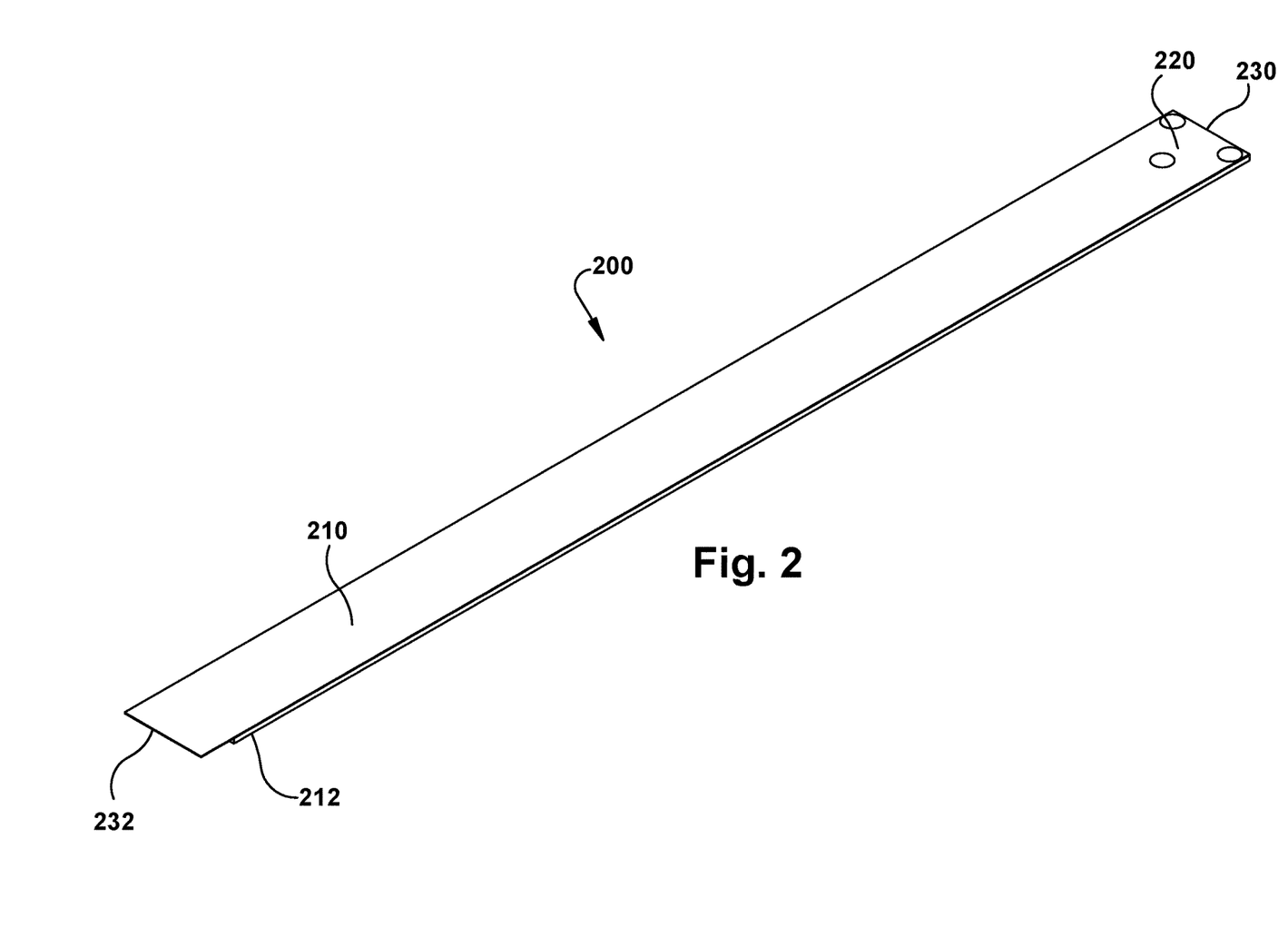
FIG. 2 shows a top perspective view of an example front loaded seal.

FIG. 2 shows an example front-loaded seal 200, such as seal 170 in FIG. 1, prior to installation and in its relaxed state. In one embodiment, the seal 200 may be a shim seal or laminated spline comprised of one or more layers of spring material. For example, the seal 200 may include a first layer 210 and a second layer 212, each comprised of a rectangular body of flexible material, such as a cobalt-based alloy (for formability, temperature tolerance, and resistance to wear and corrosion) with a desired width, length, and thickness. Other materials are possible and may be selected based upon their spring characteristics, temperature tolerance, and other physical characteristics compatible with the environment in the flow path they are sealing. The materials used in a flat spring seal may be deformable to follow the path of a curved seal channel, such as the seal channel 150 in FIG. 1, when inserted. In the example shown, the length of the first layer 210 is greater than the length of the second layer 212. Layers also may not be the same thickness or material, or may incorporate other differences to facilitate lamination, insertion, retention, spring characteristics, or sealing characteristics. The layers 210, 212 are connected by a weld 220, a three point weld in the example shown. The seal 200 may include an insertion end 230 and a retention end 232. In the example shown, the weld 220 is made proximate the insertion end 230. Other shapes, configurations, attachment between layers, number of layers, and shaping of one or both ends may also be desirable for specific embodiments and retention features.

Figure 3:
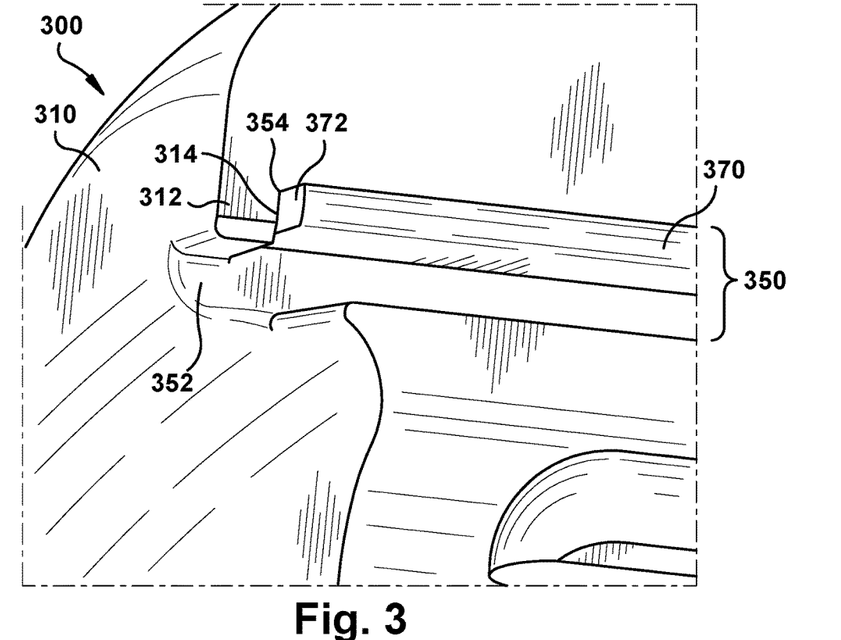
FIG. 3 shows a side perspective view of an example retention feature for a front-loaded seal.
Figure 4:
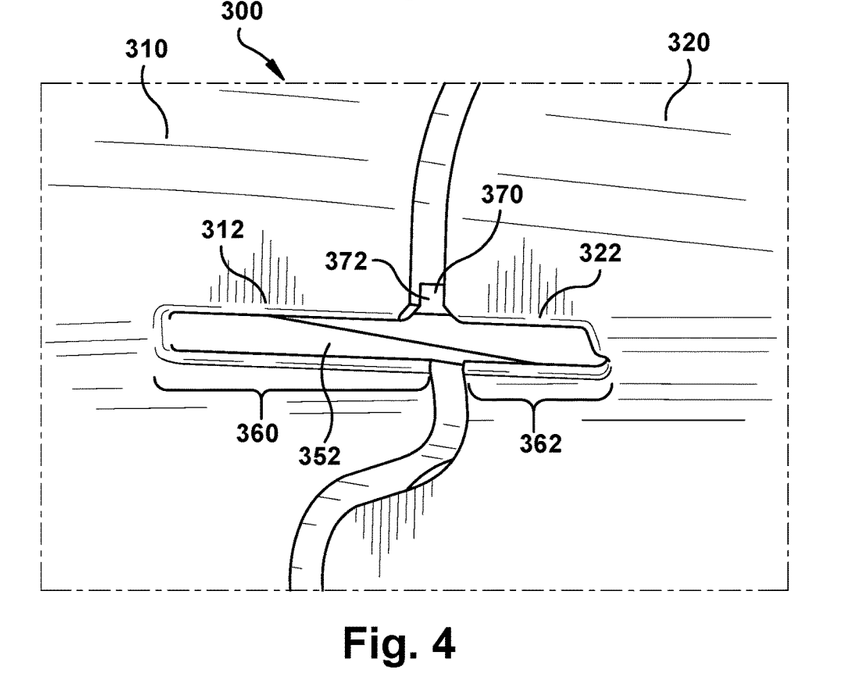
FIG. 4 shows a front perspective view of the example retention feature of FIG. 3 for the front-loaded seal between adjacent airfoil shanks.

FIGS. 3-4 shows an example retention feature 300 for a front-loaded seal 370 between adjacent flow path components 310, 320. For example, the retention feature 300 could be incorporated into front-loaded seal, like seal 170, and the forward opening of a seal channel between adjacent airfoils, such as seal channel 150 of shank 110 in airfoil 100 and an adjacent airfoil. In FIG. 3, only one flow path component 310 is shown to better show the seal 370 and the forward portion of the seal channel 350 and adjacent forward surface of the flow path component 310. In FIG. 4, both flow path components 310, 320 are shown. The retention feature 300 comprises a lip 312 adjacent the forward opening 352. The seal 370 includes an engagement end 372 in a configuration complementary to the lip 312. The seal channel 350 includes an upper wall 354 from which the lip 312 projects. The spring force of the installed seal 370 causes the engagement end 372 to be pressed upwards against the upper wall 354 and forward against the inner face 314 of the lip 312. As shown in FIG. 4, like the seal channel 350 itself, the retention feature 300 includes complementary portions on the adjacent flow path components 310, 320. The second flow path component 320 also includes a lip 322 for engaging the engagement end 372 of the seal 370. Note that the channel depths 360, 362 and therefore the portion of the forward opening 352 in each of the flow path components 310, 320 may not be equal. Thus, in the embodiment shown, the lip 322 on the second flow path component 320 is narrower than the lip 312 on the first flow path component 310. In other embodiments, these features could have greater or less asymmetries and, in some cases, the lip or other portion of the retention feature incorporated in the component may be present only on one of the flow path components.

Figure 5:
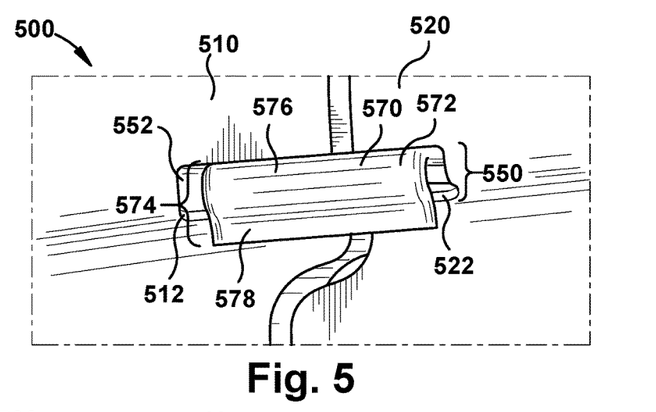
FIG. 5 shows a front perspective view of an example retention feature for a front-loaded seal between adjacent airfoil shanks.
Figure 6:
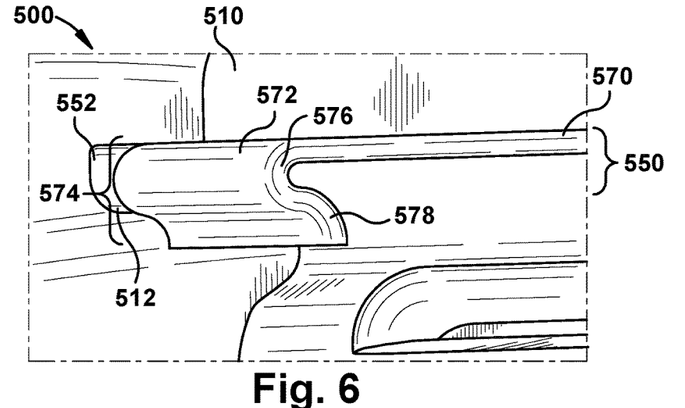
FIG. 6 shows a side perspective view of the example retention feature of FIG. 5 for the front-loaded seal (shown without the adjacent airfoil shank).
Figure 7:
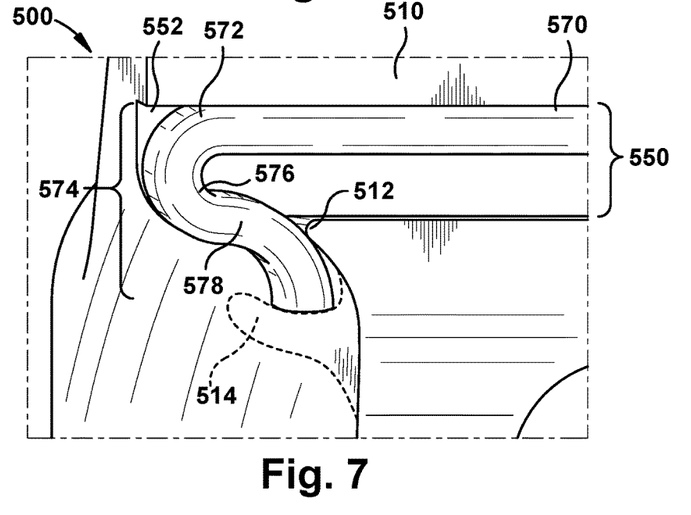
FIG. 7 shows a side perspective view of an example retention feature for a front-loaded seal similar to the front-loaded seal of FIGS. 5-6 with an additional feature on the airfoil shank.

FIGS. 5-7 show another retention feature 500 for a front-loaded seal 570 between adjacent flow path components 510, 520. The retention feature 500 may optionally incorporate a hook feature on the face of one or both flow path components 510, 520 as shown in FIG. 7. The front-loaded seal 570 includes an extension 572 that protrudes through the forward opening 552 of the seal channel 550. The extension 572 includes a hook portion 574 for providing additional retention force on the seal 570. In the embodiment shown, the hook portion 574 includes an s-hook with a first curve 576 curving back toward the forward opening 552 and a second curve 578 curving down to engage the lower lips 512, 522 of the flow path components 510, 520. The addition of a complementary hook 514 to engage and retain the end of the second curve 578 may provide additional retention force for securely retaining the seal 570.

Figure 8:
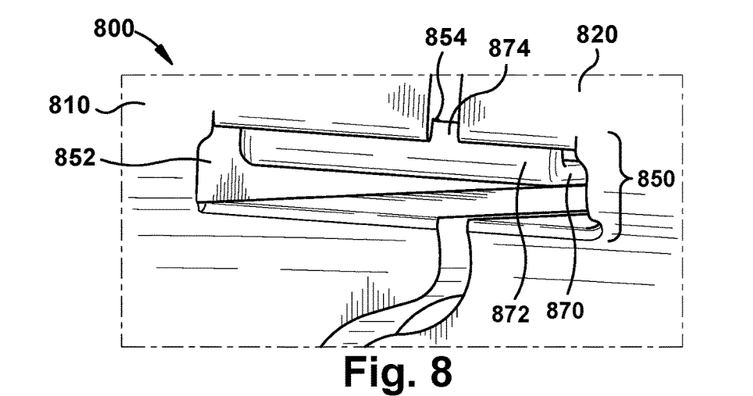
FIG. 8 shows a front perspective view of an example retention feature for a front-loaded seal between adjacent airfoil shanks.
Figure 9:
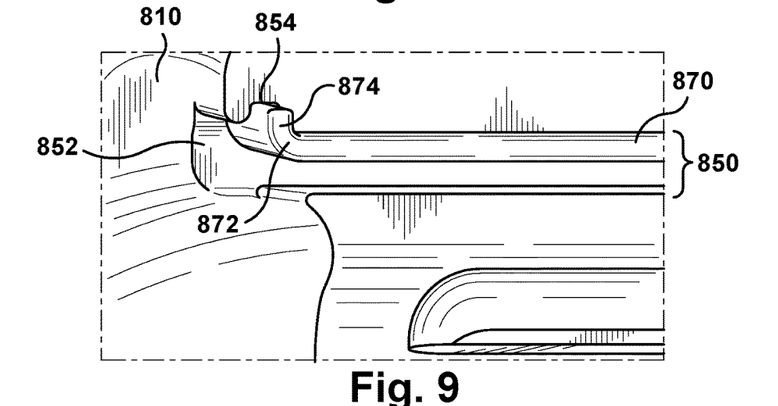
FIG. 9 shows a side perspective view of the example retention feature of FIG. 8 for the front-loaded seal (shown without the adjacent airfoil shank).
Figure 10:
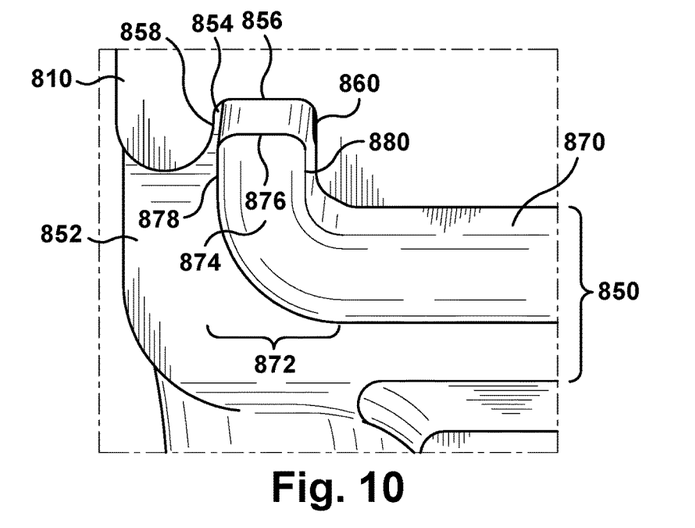
FIG. 10 shows another side perspective view of the example retention feature of FIGS. 8-9 for the front-loaded seal (shown without the adjacent airfoil shank).

FIGS. 8-10 show another retention feature 800 for a front-loaded seal 870 between adjacent flow path components 810, 820. The retention feature 800 incorporates a groove 854 slightly recessed from the forward opening 852 of the seal channel 850 for accommodating a tab 874 incorporated in the engagement end 872 of the seal 870. The groove 854 is defined by an upward surface 856, a forward surface 858, and an aft surface 860 for accommodating and engaging an end surface 876, a forward surface 878, and an aft surface 880 of the tab 874 under the spring force of the seal 870. The upward tab 874 is held in the upper groove 854 by the spring force of the seal 870.

Figure 11:
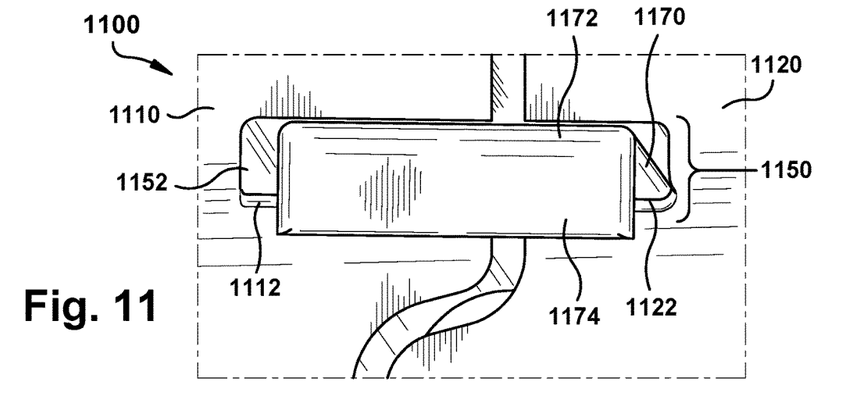
FIG. 11 shows a front perspective view of an example retention feature for a front-loaded seal between adjacent airfoil shanks.
Figure 12:
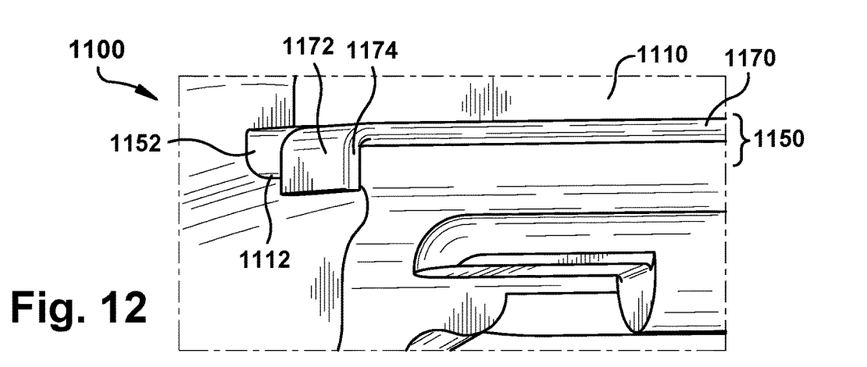
FIG. 12 shows a side perspective view of the example retention feature of FIG. 11 for the front-loaded seal (shown without the adjacent airfoil shank).
Figure 13:
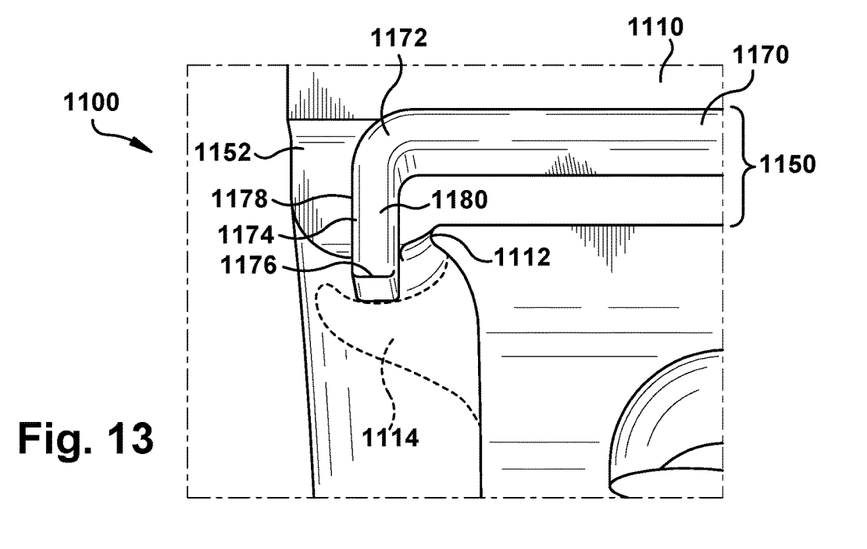
FIG. 13 shows a side perspective view of an example retention feature for a front-loaded seal similar to the front-loaded seal of FIGS. 11-12 with an additional feature on the airfoil shank.

FIGS. 11-13 show another retention feature 1100 for a front-loaded seal 1170 between adjacent flow path components 1110, 1120. The retention feature 100 may optionally incorporate a hook feature on the face of one or both flow path components 1110, 1120 as shown in FIG. 13. The seal 1170 includes an extension 1172 that protrudes through the forward opening 1152 of the seal channel 1150. The extension 1172 includes a tab 1174 for providing additional retention force on the seal 1170. In the embodiment shown, the tab 1174 is a downward tab with an end surface 1176, a forward surface 1178, and an aft surface 1180 and extends past the lower lips 1112, 1122 of the flow path components 1110, 1120. The addition of a complementary hook 1114 to engage and retain the end of tab 1174 may provide additional retention force for securely retaining the seal 1170.

Figure 14:
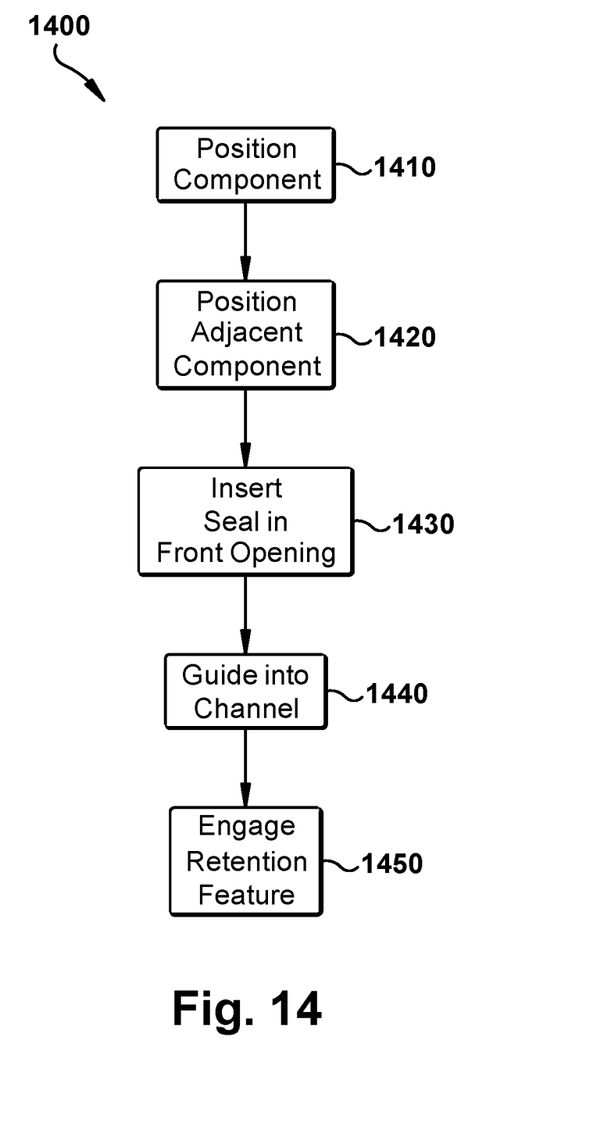
FIG. 14 shows a flow chart of an example method of installing a front-loaded seal.

FIG. 14 shows a method 1400 of installing a front-loaded seal between adjacent flow path components, such as the airfoils and other examples in the preceding figures. In step 1410, a first component is positioned, such as an airfoil being secured to a rotor using a dovetail connection. In step 1420, an adjacent component is position, such as the next airfoil in the ring. As discussed above, each component has a portion of a seal channel such that when they are positioned adjacent to one another a seal channel is formed between the two components having a forward opening. In step 1430, a seal is inserted into the forward opening defined by where the seal channel emerges from the forward surfaces of the adjacent components. In step 1440, the seal is guided through the channel until the inserted end of the seal reaches the terminal end of the seal channel and the seal substantially seals the potential flow path between the adjacent components. Being substantially sealed reduces the total potential flow path between the components by at least 85% compared to the flow path between components without the seal. A substantially complete shank seal reduces the flow path between the shank portions of adjacent airfoils by at least 99%. In step 1450, a retention feature between the seal and the adjacent components is engaged to securely retain the seal in place during operation of the turbomachine in which they are installed. For example, the engagement end of the seal may be seated behind a lip or include a hook or a tab for engaging a lip, groove, or hook in or on one or both components.

The foregoing drawings show some of the operational processing associated according to several embodiments of this disclosure. It should be noted that in some alternative implementations, the acts described may occur out of the order described or may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
a first flow path component with a forward surface, an aft surface, a pressure side surface, and a suction side surface, and wherein the pressure side surface of the first flow path component defines a pressure side portion of a seal channel;
a second flow path component with a forward surface, an aft surface, a pressure side surface, and a suction side surface, the second flow path component positioned adjacent the first flow path component, and wherein the suction side surface of the second flow path component defines a suction side portion of the seal channel; and,
a seal retained within the seal channel formed by the pressure side portion and the suction side portion; and, wherein the second flow path component is positioned adjacent the first flow path component before the seal is installed and the seal channel defines a forward opening through which an aft end of the seal is inserted during installation and the aft end of the seal guided through the seal channel to an aft position, resulting in a forward end of the seal being positioned at the forward opening.

2. The system of claim 1, wherein the first flow path component has a body width from the forward surface to the aft surface and a shank height substantially perpendicular to the body width and wherein the seal channel extends from the forward opening and extends substantially along the body width and substantially along the shank height.

3. The system of claim 2, wherein the seal extends continuously from the forward opening and through the seal channel substantially along the body width and substantially along the shank height to substantially seal at least one leakage path defined between the first flow path component and the second flow path component.

4. The system of claim 1, further comprising a damper pin between the first flow path component and the second flow path component and at least partially defining an adjacent leakage path and wherein the seal substantially seals the adjacent leakage path of the damper pin.

5. The system of claim 1, wherein the first flow path component defines a retention feature adjacent the forward opening for holding the seal in place after installation.

6. The system of claim 5, wherein the retention feature is selected from a lip, a slot, and a hook.

7. The system of claim 1, wherein the seal defines a retention feature in a forward portion of the seal adjacent to the forward opening for holding the seal in place after installation.

8. The system of claim 7, wherein the retention feature is selected from a tab and a hook and wherein the retention feature is compatible with a complementary retention feature defined on the first flow path component adjacent the forward opening.

9. A method comprising:
  positioning a first flow path component with a forward surface, an aft surface, a pressure side surface, and a suction side surface, and wherein the pressure side surface of the first flow path component defines a pressure side portion of a seal channel;
  positioning a second flow path component adjacent the first flow path component, the second flow path component having a forward surface, an aft surface, a pressure side surface, and a suction side surface, and wherein the suction side surface of the second flow path component defines a suction side portion of the seal channel;
  inserting a seal into a forward opening between the forward surface of the first flow path component and the forward surface of the second flow path component after the second flow path component is positioned adjacent the first flow path component, the forward opening defined by the seal channel formed by the pressure side portion and the suction side portion of the seal channel; and
  guiding an aft end of the seal through the seal channel to an aft position, resulting in a forward end of the seal being positioned at the forward opening.

10. The method of claim 9, wherein the first flow path component has a body width from the forward surface to the aft surface and a shank height substantially perpendicular to the body width and wherein the seal channel extends from the forward opening and extends substantially along the body width and substantially along the shank height.

11. The method of claim 10, wherein the seal extends continuously from the forward opening and through the seal channel substantially along the body width and substantially along the shank height to substantially seal at least one leakage path defined between the first flow path component and the second flow path component.

12. The method of claim 9, further comprising the step of installing a damper pin between the first flow path component and the second flow path component and at least partially defining an adjacent leakage path and wherein the seal substantially seals the adjacent leakage path of the damper pin.

13. The method of claim 9, wherein the first flow path component defines a retention feature adjacent the forward opening and further comprising the step of engaging the seal to the retention feature for holding the seal in place.

14. The method of claim 13, wherein the retention feature is selected from a lip, a slot, and a hook.

15. The method of claim 9, wherein the seal defines a retention feature in a forward portion of the seal adjacent to the forward opening and further comprising the step of engaging the retention feature to the first flow path component for holding the seal in place.

16. The method of claim 15, wherein the retention feature is selected from a tab and a hook and the retention feature is compatible with a complementary retention feature defined on the first flow path component adjacent the forward opening, and the step of engaging the retention feature comprises engaging the retention feature of the seal with the complementary retention feature.

17. A seal comprising:
  a flexible member conforming to a seal channel defined between adjacent flow path components; the flexible member comprising:
    an axial portion extending substantially from a forward surface of the adjacent flow path components to an aft surface of the adjacent flow path components;
    a radial portion extending substantially along a height of the adjacent flow path components proximate the aft surface of the adjacent flow path components and continuous with the axial portion;
    a forward end continuous with the axial portion and adjacent a forward opening of the seal channel defined by the forward surface of the adjacent flow path components; and,
    an aft end continuous with the radial portion, wherein the aft end is inserted through the forward opening of the seal channel and guided through the seal channel to an aft position, resulting in the forward end of the seal being positioned at the forward opening.

18. The seal of claim 17, wherein the seal substantially seals at least one leakage path defined between the adjacent airfoil shanks.

19. The seal of claim 17, wherein the forward end comprises a retention feature for engaging the adjacent flow path components and retaining the seal in place.

20. The seal of claim 19, wherein the retention feature is selected from a tab and a hook and the retention feature is compatible with a complementary retention feature defined on the adjacent flow path components.

* * * * *